Figure 1:
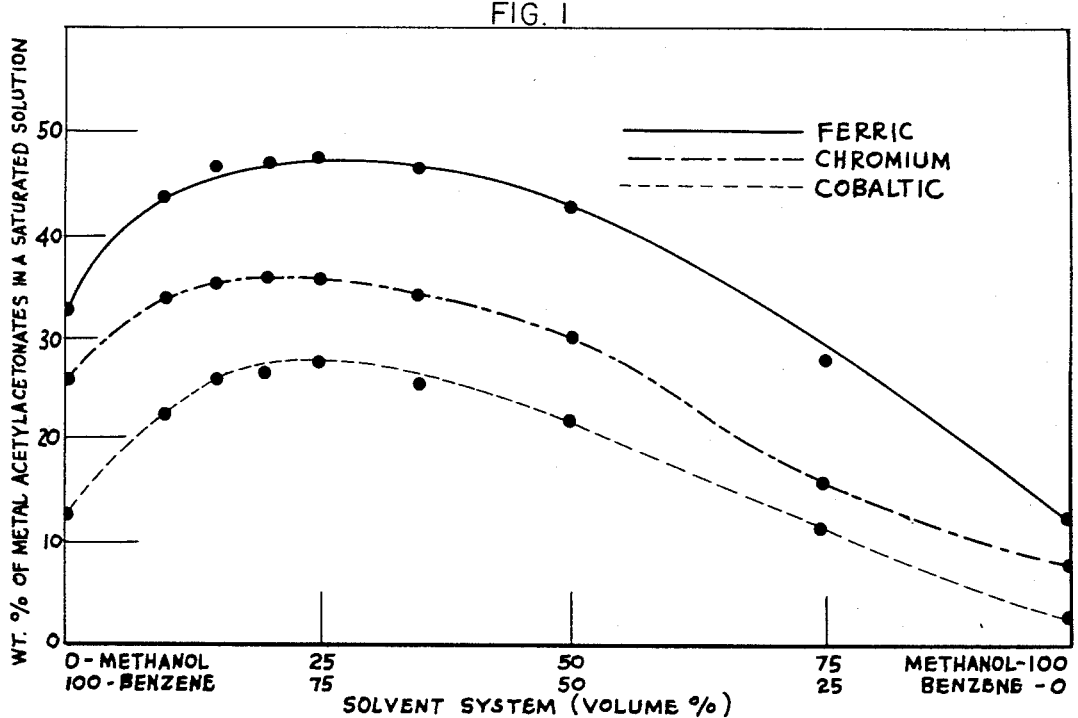
Figure 2:
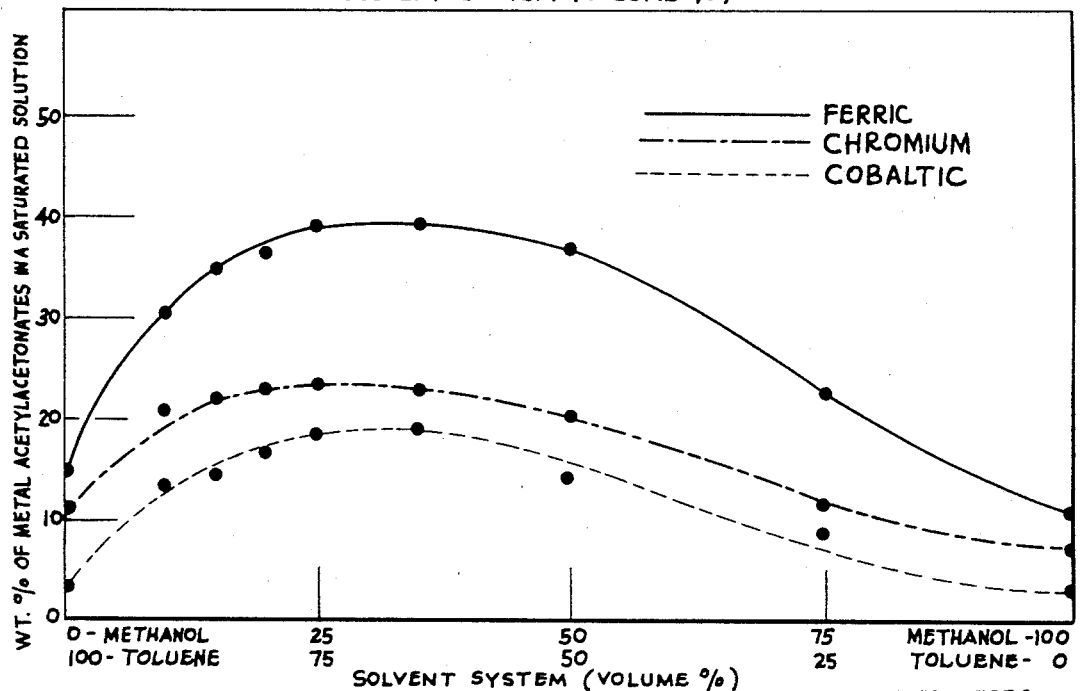

Nov. 19, 1968   O. D. ENGLEHART ET AL   3,411,934
METHOD OF PRODUCING TIN OXIDE-COBALT OXIDE PLURAL
LAYERS ON GLASS ARTICLES
Filed April 15, 1964

INVENTORS
OSCAR D. ENGLEHART and
BY JOSEPH E. MICHELOTTI

Chisholm and Spencer
ATTORNEYS

3,411,934
METHOD OF PRODUCING TIN OXIDE-COBALT OXIDE PLURAL LAYERS ON GLASS ARTICLES

Oscar D. Englehart, Brackenridge, and Joseph E. Michelotti, Pittsburgh, Pa., assignors to PPG Industries, Inc., a corporation of Pennsylvania
Continuation-in-part of application Ser. No. 332,934, Dec. 23, 1963. This application Apr. 15, 1964, Ser. No. 360,031
10 Claims. (Cl. 117—33.3)

The present application is a continuation-in-part of application Ser. No. 332,934, filed Dec. 23, 1963 and now abandoned, for Coated Article and Process.

This invention is directed to the preparation of transparent, metal oxide coated glass articles primarily suited for use as radiant solar energy transmittance reducing, transparent viewing closures, and a method of preparing such improved viewing closures.

Because of its good solar shielding properties, cobalt oxide is a promising candidate for use as a coating in transparent solar heat shielding glass. However, the employment of cobalt oxide films for this purpose has never gained wide commercial acceptance due to several vexing problems.

One of the chief problems in depositing cobalt oxide films is that it is very difficult to secure the necessary adherence of a cobalt oxide film to the glass base upon which it is deposited. Moreover, extreme trouble has been experienced in the form of a mottled (patchy) appearance of the cobalt oxide films when formed. The mottled appearance is perhaps due to non-uniform adhesion of the cobalt oxide film to glass and entrapment of unpyrolyzed organic carriers and organic metal residues. Also, associated with the mottled appearance, cobalt oxide films deposited on glass possess comparatively poor film texture and display a lack of uniformity, not only in adherence of the film, but also in the thickness of the film deposited in various areas of the coated glass substrate.

The above problems are further compounded by inadequate durability, particularly moisture resistance, of the coated glass article. This seriously curtails the use of the coated article in situations where it is exposed to climatic conditions. Earlier attempts to improve the durability of cobalt oxide films by adding organic compounds of nickel, tin, or iron to the coating solution and various additional heat treatments are only successful to a limited degree.

Other difficulties encountered in attempts to deposit cobalt oxide films upon glass are film streaking and crazing. Film streaking is evidenced by circular, vertical or diagonal minor variations in film texture, which variations, if of severe enough nature, cause rejection of the cobalt oxide coated article for aesthetic reasons as transparent solar shielding viewing closures.

The prior art attempts to overcome these problems in conjunction with the development of satisfactory cobalt oxide films on glass have been essentially ineffectual. Consequently cobalt oxide coated glass articles have never attained their potential as solar energy reducing coatings for transparent viewing closures.

The above mentioned defects can be substantially eliminated or at least controlled to a large extent by the practice of the present invention. According to the invention, the glass surface is first provided with a thin tin oxide undercoating at an elevated temperature and thereafter before the glass article has an opportunity to cool, overcoated with a cobalt oxide film formed by the thermal pyrolysis of a cobalt compound such as cobalt acetylacetonate. By observing these two essential features, providing a tin oxide undercoat and utilizing a single firing process, the problems of poor adhesion, film mottling, poor film texture and crazing, lack of uniformity in thickness, inadequate moisture resistance and generally poor durability can be substantially eliminated.

The problem of film crazing which can occur in a dual heating process both with respect to the tin oxide undercoat and the cobalt oxide solar shielding overcoat is satisfactorily solved in accordance with this invention by observing the two previously mentioned features. Film crazing usually occurs when a previously coated glass article is subjected to a second heating or firing operation after the article has once been heated, coated and allowed to cool below its strain point. The glass base having a greater coefficient of expansion, expands more quickly than the coating during subsequent heating, causing small cracks or fissures to result in the coating. The crazing problem is further compounded when a coating which is non-uniform in thickness is applied to the glass.

We have discovered that film crazing can be substantially eliminated by first taking care in the deposition of the tin oxide undercoat to avoid depositing the tin oxide film in too great a thickness and secondly, to thermally pyrolyze the cobalt acetylacetonate to deposit the cobalt oxide film immediately after formation of the tin oxide undercoat, while maintaining the glass at an elevated temperature sufficient to form the cobalt oxide film. By depositing both coatings in a single step using the same heat, and by employing a comparatively thin tin oxide film as the undercoat material, the problem of film crazing with respect to both the tin oxide and cobalt oxide films can be substantially eliminated.

Preparation of the glass base for coating

The film streaking problem can be satisfactorily controlled to the point where it is no longer a substantial cause of rejections by subjecting the glass surface or surfaces to be coated to a demineralized water rinse prior to the heating operation which precedes the deposition of the thin tin oxide undercoat. For this purpose the demineralized water which is to be employed as a preheating rinse should have a numerical hardness rating below 6 parts per million, alkalinity below 20 parts per million when titrated to the phenolphthalein end point, and a total solids content of less than 75 parts per million when determined at 110° centigrade. The preferred pH of the rinse water employed should be below 7; however, rinse water having the above characteristics but having a pH as high as 10 has been successfully employed. Conventional glass cleaning and rinsing equipment can be employed in preparing the glass base for coating according to this invention.

The procedure for preparing the glass base for coating in accordance with this invention usually involves, first, sprinkling fine pumice onto the glass surface to be coated, followed by a spraying with normal warm tap water, viz., tap water ranging from room temperature to approximately 110° F., to wet down the pumice and form a slurry with the pumice particles serving as abrasive particles for cleaning the glass surface to be coated. The aqueous pumice slurry is then scrubbed for approximately one minute with rollers according to conventional glass cleansing procedures and using conventional glass cleansing rollers in order to remove dirt, scum, and other undesirable foreign materials from the glass surface. Then, the scrubbed, cleaned glass surface is rinsed with the same tap water to remove any pumice particles contained thereon. Following this tap water rinse, the glass surface to be coated is sprayed, rinsed or otherwise contacted with demineralized water. This demineralized rinse water need not be warmed and can be at ambient room temperature, viz., 60° to 90° F. However, while the demineralized water need not be warmed, no unsatisfactory results occur if the demineralized water employed for the preheating rinse is warmed.

Shortly after the demineralized water rinse, and preferably immediately after drying the water from the glass article by dry compressed air, the glass base is heated to a temperature ranging from about 400° F. to below the glass softening temperature prior to deposition of the thin tin oxide undercoat. Usually, the glass base is heated to a temperature ranging from about 800 to 1350° F. prior to deposition of the thin tin oxide undercoat, and preferably the glass surface is preheated to a temperature ranging from about 1000 to 1300° F. The preferred temperature to which the glass base is heated prior to deposition of the thin tin oxide undercoat can vary somewhat according to the specific composition of the glass base to be coated. However, for most soda-lime-silica glass base compositions, the above-noted temperature range is quite satisfactory.

The glass base is heated in conventional fashion by passing it through a conventional heating furnace where the glass temperature is raised from ambient room temperature to the desired filming temperature over a period of about 3½ to 6 minutes. This heating period is given herein in a directory sense, but longer or shorter time periods can be used to raise the glass to the desired filming temperatures, depending upon whether a more gradual or more rapid heating is desired.

Deposition of the tin oxide undercoat

In applying the tin oxide undercoat, care should be exercised to deposit a thin, transparent, tin oxide film. For the purposes of this invention, the thickness of the tin oxide film deposited should not exceed 0.05 micron. Usually, the tin oxide film undercoat has a thickness ranging from about 0.01 to 0.045 micron, and more preferably from 0.023 to 0.042 micron.

In selecting the tin-containing compound or salt which is employed to form the tin oxide coating, a tin-containing, tin oxide-yielding compound should be selected which not only forms a thin tin oxide film in the above-noted thickness ranges but is also capable of forming a thin film in uniform thickness and having excellent adherence to the glass base upon which it is deposited. Furthermore, a tin-containing, tin oxide-yielding compound which is capable of being readily dissolved or dispersed in the coating solvent and which is capable of remaining dissolved or dispersed uniformly therein during the contact of the tin compound with the heated glass base should be employed.

As a general class of materials, organic tin compounds come the closest to filling the above-mentioned desired requisites as tin-containing, tin oxide-yielding coating materials. Inorganic tin compounds may also be employed to form the desired tin oxide films; however, the use of many of these compounds results in additional reactions with alkali on the glass surface forming a haze thereon which renders the tin oxide coated article aesthetically less desirable. Such procedures as dealkalization of the glass base and/or deposition of a protective, alkali-barrier film prior to depositing the tin oxide coating usually are required when a tin oxide film is formed from inorganic tin salts and compounds.

In order to attain the fullest measure of the benefits, including the economic savings, afforded by this invention, organic tin compounds are preferably employed. Organic tin compounds which can be used in accordance with this invention to produce suitable, thin, transparent tin oxide coatings include: dibutyl tin oxide; stannous octylates, such as stannous-2-ethylhexanoate, stannous isooctylate, and mixtures of two or more of these stannous octylates; tributyl tin oxide; dibutyl tin diacetate; dibutyl tin dilaurate; tributyl tin acetate; dibutyl tin maleate; dibutyl tin di-2-ethylhexanoate; monobutyl tin tri-2-ethylhexanoate; tributyl tin mono-2-ethylhexanoate; stannous acetate; stannous-n-propylate; dibutyl tin dilaurate; tin acetylacetonate; etc. While the above organic tin compounds have been listed as exemplary, it should be realized that other tin-containing, tin oxide-yielding, organic tin compounds can be used which satisfy the above defined requisites for employment as a tin oxide-forming compound.

Dibutyl tin oxide is a preferred tin oxide-forming, tin-containing, organic tin compound, not only because it yields tenaciously adherent, thin tin oxide films of uniform thickness, but also because of its high weight concentration of tin. This allows the deposition of the desired thin tin oxide undercoat to occur very rapidly.

In depositing the tin oxide coating onto the heated glass base, the organic tin-containing compound is preferably first dissolved in a suitable solvent, e.g., an organic solvent. A pH control is added to the coating solution to assure the maintenance of a pH below about 8 in the coating solution or dispersion prior to contacting it with the heated glass surface to be filmed. The specific solvent chosen will depend upon the specific organic tin compound employed to form the tin oxide coating. Although the solvent is normally employed primarily as a carrier for the organic tin-containing compound, in the practice of the present invention it is also employed as diluent to reduce the concentration of the tin containing compound in the coating solution. This is necessary because of rapid film forming characteristics of the dibutyl tin oxide and because the present invention requires only a very thin tin oxide film.

In selecting the organic solvent to be employed for dissolving the chosen organic tin compound, the pertinent considerations are the toxicity of the solvent material and its clean burning properties upon pyrolysis due to contact with the preheated glass base. When dibutyl tin oxide is employed as the organic tin-containing, tin oxide-yielding compound, the organic solvent of choice is normal propanol.

In addition to the desired organic tin compounds and the chosen organic solvent, the tin oxide-forming coating solution usually contains adjuvant agents which, in one manner or another, assist in forming good tin oxide films. The primary consideration in choosing such adjuvant materials for inclusion in the tin oxide-forming coating solution revolves about their ability to assist in forming continuous, transparent, substantially colorless, uniformly textured tin oxide films of good optical clarity. The inclusion of various adjuvant coating agents in the tin oxide-forming solution will be discussed hereinafter in conjunction with the specific examples.

The selected organic tin coating solution, e.g., a normal propanol solution of dibutyl tin oxide, is contacted with the previously heater glass base conveniently by any one of a wide variety of coating and contacting procedures. Satisfactory results have been secured in depositing tin oxide films having the above-mentioned desired properties by spraying normal propanol solutions of dibutyl tin oxide onto the previously heated glass base. However, other coating and contacting systems can be used, such as flow coating, screening, roller coating, immersion and dip coating, etc.

The atmosphere or environment in which the organic tin compound-containing coating solution is contacted with the previously heated glass base should contain a source of oxygen to ensure the development of a tin oxide film upon thermal pyrolysis of the organic tin compound. Ordinary air will suffice for this purpose. However, other gaseous oxygen-containing process environments and atmospheres can be employed, e.g., air having an enriched oxygen content due to mixture with oxygen gas.

At the time of spraying the organic tin compound-containing solution onto the previously heated glass, the temperature of the glass surface to be filmed should range from about 1000 to 1300° F. or slightly higher, but the glass surface should not be at such a high temperature that the glass will soften. At these high temperatures, the organic moieties of the organic tin compound, as well as the organic solvent itself, are thermally pyrolyzed, viz., burned off and oxidized eventually to carbon dioxide and water as a chief pyrolysis by-product. The immediate volatilization of the organic solvent prevents overspray problems. At the same time, the tin moiety of the organic tin compound is oxidized during spray atomization to the desired tin oxide state. In this regard, the use of conventional air spray applicator systems for proper fluid atomization is helpful in applying the organic tin compound-containing solution, as this air spray further assists in the oxidation of the organic tin compound to the desired tin oxide state. The procedural details of applying a tin oxide film are further described in U.S. Patent No. 3,107,177.

Reposition of the cobalt oxide coating

The cobalt oxide-containing overcoating which is formed on the thin, tenaciously adherent, tin oxide film is formed from a cobalt oxide film forming compound such as cobalt acetylacetonate by thermal pyrolysis thereof in order to secure the objectives and benefits attainable with this invention. Preferably, and to secure the fullest measure of the benefits attainable by this invention, the deposition of the cobalt oxide coating should occur immediately after contacting the organic tin-containing compound with the previously beated glass base so that, in effect, the entire coating procedure requires only a single glass heating process wherein the same thermal energy imparted to the glass to pyrolyze the tin oxide film is also utilized to effect pyrolytic decomposition of the cobalt-containing solution and develop the desired cobalt oxide coating on the glass.

The development of both coatings by means of a single heating process is preferred, not only because of the savings of thermal energy attained, but also, and more importantly, due to the fact that this procedure substantially eliminates the crazing problem discussed above. Moreover, the further advantage of tenacious adherence of the cobalt oxide film could be, in part, due to its deposition onto the tin oxide coating at the same time the tin oxide coating is formed by thermal pyrolysis of the organic tin-containing compound. The reason for the outstanding ability of cobalt acetylacetonate to form cobalt oxide films having the desired properties is not completely explainable at the present time. However, it is believed that the fast, efficient thermal pyrolysis of cobalt acetylacetonate and the organic solvent employed results in less, indeed substantially no entrapment of unpyrolyzed organic carriers and organic metal residues. Of course, it should be realized that the beneficial advantages concerning the properties of the cobalt oxide film are not necessarily dependent upon these or any other theory as to the attainment of the advantages secured therein in accordance with this invention.

The term "cobalt oxide-containing" metal oxide film and similar expressions as used herein have been employed to indicate that the overcoating film, while it must contain substantial amounts of cobalt oxide, i.e., from 25 percent by weight up to 100 percent by weight, can additionally contain up to 75 percent by weight of other oxides, such as 0.1 to 75 percent by weight of the oxides of iron and/or chromium. Cobalt oxide should be a substantial constituent of the overcoated metal oxide film because of its good solar-shielding properties, viz., its ability to reduce transmitted radiant solar energy in transparent viewing closures.

The oxides of iron and chromium are preferably included in the cobalt oxide-containing metal oxide overcoat as they do not detract from the solar heat ray shielding properties of the cobalt oxide, but do assist in obtaining harder solar shielding films which are more resistant to surface damage, e.g., scratching, than a metal oxide film having cobalt oxide as the sole constituent. Moreover, the inclusion of iron oxide and chromium oxide in the cobalt-containing metal oxide film also imparts pleasing coloration to these transparent films, which colorations have an aesthetic value especially in transparent viewing closures having architecturally pleasing utilities. In addition, oxides of iron, although not as efficient as oxides of cobalt, also contribute to the solar shielding characteristics of the desired resulting article.

While the cobalt oxide component of the solar heat ray shielding metal oxide overcoat is preferably formed from cobalt acetylacetonate in accordance with this invention, the adjuvant metal oxides in the metal oxide overcoated glass, such as iron oxide, chromium oxide, etc., need not necessarily be derived from the pyrolysis of their corresponding acetylacetonate. However, when the solar shielding metal oxide film contains other metal oxides in addition to cobalt oxide, it is preferred that these other metal oxides be formed from their acetylacetonate, and by so doing greater compatibility, uniformity, and metal oxide film texture can be achieved along with the procedural advantages of faster, more efficient, deposition of the cobalt-containing metal oxide overcoatings.

White iron oxide and chromium oxide had been referred to herein as adjuvant metal oxide materials for inclusion with cobalt oxide in the solar shielding cobalt oxide-containing film, other metal oxides, preferably also formed from the corresponding acetylacetonate, can also be included in the cobalt oxide-containing coating. The following metal oxides can be included in place of or in addition to either iron oxide and chromium oxide for forming cobalt oxide-containing metal oxide solar shielding films having a wide variety of colors and other beneficial properties: nickel oxide, manganous oxide, manganic oxide, cupric oxide, ferrous oxide, ferric oxide, vanadium oxide, titanium oxide, titanyl oxide, cerium oxide, zirconium oxide, tin oxide, and thorium oxide.

The cobalt acetylacetonate coating solutions can be prepared in similar fashion as noted above in conjunction with the preparation of organic tin compound containing coating solutions, that is, by dissolving or dispersing cobalt acetylacetonate, as well as the iron, chromium, and other respective metal oxide forming precursor compounds into a suitable organic solvent. The solution containing the cobalt acetylacetonate and the respective additional precursor compounds can be applied to the hot glass base now containing a freshly formed, thin tin oxide coating concomitantly developed thereon.

A superior solvent system for the metal acetylacetonates, particularly for metals in their highest valence states, is comprised of an organic polar compound along with a non-polar aromatic compound. The polar component is an alcohol containing 1 to 4 carbon atoms with one hydroxyl group. Representative polar components that may be employed include methanol, ethanol, 1-propanol, 2-propanol, 1-butanol, 2-butanol and isobutanol. The aromatic non-polar components that may be used include benzene, toluene and xylene. In the practice of the present invention, the preferred range for each of the components comprising the solvent mixture is 5 to 75 percent by volume of the alcohol component and 95 to 25 percent by volume of the aromatic non-polar component.

By employing a methanol-benzene or methanol-toluene solvent system, the metal acetylacetonates can be dissolved to form true solutions at room temperature having the greatly increased metal content necessary to form metal oxide films on hot glass. These systems produce an increased film formation rate and enhance solution stability, both of which are necessary for the production of mottle-free films by the spray application of metal oxide film-forming solutions.

In addition, the fact that increased solubility can be obtained at room temperature is an added advantage, since the coating solution can be more easily prepared without the necessity of heated mixing equipment, special storage conditions or heated spraying apparatus.

While any satisfactory contacting or coating procedure can be used to deposit the cobalt acetylacetonate-cobalt oxide forming solution onto the hot, freshly tin oxide filmed heated glass surface, spray application utilizing conventional atomization has yielded the best results so far. In this regard, adequate precaution must be taken to insure the presence of a sufficient amount of air, or other oxygen-containing gas, to insure oxidation of the cobalt acetylacetonate to cobalt oxide in a reasonably rapid period of time.

As mentioned above, the most preferred way of conducting the cobalt oxide filming procedure is to deposit the cobalt oxide film immediately after spraying the tin oxide-forming organic tin compound-containing solution onto the previously heated glass surface. In this regard, a satisfactory time lag between the initial deposition of the tin oxide-forming coating on the hot glass and the onset of the contact of the cobalt acetylacetonate containing cobalt oxide-forming solution should not exceed about 5.0 seconds without supplementary heating in order to secure the ultimate benefits obtainable in accordance with this invention. Usually the time lag ranges from about 0.3 to 3 seconds, and more preferably from 0.5 to 1.7 seconds.

This almost simultaneous deposition of both the tin oxide and cobalt oxide coatings can be accomplished readily by placing the glass article with the surface to be filmed positioned upward on a conveyor belt moving at a linear rate of speed of from 36 to 140 inches per minute through a heating oven equipped to heat the glass from room temperature to a temperature of from about 1000 to 1400° F. in a period of 3½ to 6 minutes, depending on the composition and thickness of the particular glass article. Then, immediately upon exit of the hot glass article from the heating furnace, the tin oxide coating solution is sprayed or otherwise propelled in the presence of an oxygen-containing atmosphere, e.g., air, onto the hot glass surface. Immediately thereafter, the cobalt oxide-forming coating solution is applied to deposit the cobalt oxide coating onto the fresh tin oxide coating.

Various suitable arrangements of a plurality of spray guns or other air-spray applicator systems suffice to insure rapid deposition of the cobalt oxide-forming spray solution onto the hot, tin oxide filmed glass surface. Any arrangement of a wide variety of spraying or other contacting systems which insure adequate rapid contact of the cobalt coating solution within a period of about 5 seconds after the initial contact of the tin oxide-forming coating with the hot glass surface can be employed. Exemplary arrangements of such coating and other contacting devices are referred to more specifically below in the examples.

While, as mentioned above, the most preferable way of practicing the present invention involves an almost simultaneous deposition of both the tin oxide and the cobalt oxide coatings, deposition of the tin oxide coating followed by the formation of the cobalt oxide film thereon is also included within the purview of this invention. However, to eliminate the crazing problem which occurs when the cobalt acetylacetonate coating solution is not deposited on the tin oxide coated surface of the glass immediately after the deposition of the tin oxide-forming solution, it is necessary to form the cobalt oxide film on the tin oxide film before the temperature of the glass drops below its strain point. Therefore, when a time lag exists between the deposition of the tin oxide and cobalt oxide films, it is usually necessary to provide supplementary heat to the tin oxide filmed glass article to offset the cooling effect of the tin oxide coating in order that the article be maintained at a temperature ranging from about 1000 to 1300° F. or higher, depending upon the strain point of the specific base glass composition being filmed. Such supplementary heating may be required to offset the cooling effect of the tin oxide coating and of cooling resulting from the ambient temperature and/or drafts or air currents.

With either of the above techniques, i.e., whether the cobalt oxide-forming solution is applied immediately following the tin oxide-forming solution, or if a time lag exists between the deposition of the two coating solutions, the glass is preferably supported in a horizontal position during filming, and the spraying or other coating devices are then arranged to propel and atomize the respective coating solutions onto the top glass surface to be filmed from a generally perpendicular direction.

In addition to the film-forming function, the spray application of both the tin oxide-forming coating solution and the cobalt oxide-forming coating solution imparts heat strengthening characteristics to the glass article due to the rapid cooling effect resulting from this method of application. The dual spraying immediately following the single heating operation rapidly cools the glass from a temperature well above the strain point to a temperature below the strain point more efficiently than earlier utilized single spraying procedures. Such rapid cooling establishes compressive stresses near the surfaces and edges of the glass article thereby enhancing the strength thereof. For example, a minimum edge compression of 500 m$\mu$ can be maintained for large glass plates, i.e., approximately 6 feet by 12 feet by ¼ inch thick. Comparable size glass plates to those above were provided with a similar metal oxide coating except that these plates were coated by means of a single spray procedure without utilizing the tin oxide undercoat, such as that disclosed in U.S. patent application Ser. No. 92,169 of Saunders et al., filed on Feb. 28, 1961. These latter plates have been observed as having edge compression values as low as 350 m$\mu$.

Subsequent to the deposition of the cobalt oxide containing metal oxide solar heat shielding overcoat film, the glass article is cooled. The cooling procedure can be conducted in a more or less gradual fashion, or it can be conducted rapidly with the latter procedure imparting varying degrees of thermal temper thereby further enhancing the strength of the entire coated glass article.

As mentioned hereinabove, the glass is preferably supported in a horizontal position during application of the tin oxide and cobalt oxide coatings thereon. In such cases the bottom glass surface can be in contact with supporting rollers, some of which can be driven. The lead edge of the top surface of the glass article is contacted first with the tin oxide film-forming solution and secondly with the cobalt oxide-forming solution.

Foraminous conveyor belts, or arrangements of rollers possessing partial air support for the under surface of the glass can be used in place of rollers for supporting glass during the heating, coating and cooling operations. Moreover, the glass can be partially or totally supported horizontally by a thin film of air or other inert gaseous media during heating, coating and cooling. An example of an air support device can be found in the U.S. patent application Ser. No. 140,135 of Fredley et al., filed on Sept. 22, 1961, now abandoned.

After cooling of the coated glass article has taken place, the coated article is inspected prior to use as a transparent viewing enclosure with reduced solar heat transmittance.

One of the chief properties required in cobalt oxide filmed glass articles intended for use as transparent heat shielding viewing enclosures is that they must possess good moisture resistance and general durability to outdoor exposure. In this conjunction, we have discovered that it is essential to first deposit the tin oxide film onto the glass prior to the deposition of the cobalt oxide-containing film. If the tin oxide undercoat film is omitted and the cobalt oxide film is deposited directly onto the hot glass, the cobalt oxide films thus formed do not possess the requisite moisture resistance and durability to outdoor exposure. Thus while adherent cobalt oxide coatings can be formed directly on glass by spraying an organic solution of cobalt acetylacetonate onto a previously heated glass surface, the cobalt oxide film formed thereby will not have the moisture resistance and durability required for use in viewing enclosures which contact the elements.

To exemplify the absolute necessity of employing a tin oxide undercoating prior to deposition of the cobalt oxide-containing films, six months exposure tests of cobalt oxide coated soda-lime-silica glass plates having identical glass compositions were conducted. One group of the glass samples tested were provided with a cobalt oxide coating applied directly onto the surface of hot glass, whereas the other group of samples were provided with a preliminary thin tin oxide undercoat followed by the cobalt oxide overcoating. The cobalt oxide films in both cases were formed by thermal pyrolysis of cobalt acetylacetonate using the same organic coating solutions and the same filming temperatures.

The results of this six month outdoor exposure test were striking. None of the cobalt oxide coatings which were applied over tin oxide primed glass failed, but all of the cobalt oxide coatings which were applied directly onto the bare glass surface failed due to inadequate moisture resistance and unsatisfactory durability. The explanation for these dramatic tests results is not completely understood. However, it is believed to be due to the attack of moisture at the cobalt oxide-glass interface. If such is the case, it then appears that the thin tin oxide undercoat prevents or substantially inhibits the access of moisture to the cobalt oxide-glass interface, thereby acting as the moisture resistant barrier layer.

Moreover, experimental evidence presently available indicates that the tenacious adherence of the cobalt oxide film is substantially assisted by the presence of a tin oxide undercoat since the cobalt oxide coatings deposited on tin oxide filmed glass display far greater adherence than those deposited onto bare glass surfaces despite the fact that in both cases the identical base glass composition was employed, both groups of articles were subjected to the same precoating conditions, viz., demineralized water rinse, filming temperatures, and both cobalt oxide films were formed from cobalt acetylacetonate.

The invention is illustrated in greater detail in the examples which follow. It should be understood, however, that the invention in its broadest aspects is not necessarily limited to the use of the specific temperatures, solvents, coating procedures, contacting procedures, adjuvant coating materials, and other procedural limitations set forth in the examples below.

Example I.—Glass composition

| Component | Percent by weight |
| --- | --- |
| $SiO_2$ | 73.0 |
| $Na_2O$ | 13.2 |
| CaO | 8.5 |
| MgO | 3.5 |
| $Al_2O_3$ | 1.2 |
| $Na_2SO_4$ | 0.4 |
| NaCl | 0.1 |
| $Fe_2O_3$ | 0.1 |

Glass sheets 12 inches by 12 inches by ⅛ inch of the calculated composition listed above were dusted with fine pumice and sprayed with warm tap water (110° F.) to wet down the pumice and form a slurry for cleaning the glass surface to be filmed. The glass surface was then scrubbed with conventional scrubbing rollers for a period of approximately 1 minute to clean surface dirt, scum and other foreign particles from the glass surface. Then the aqueous pumice cleaning slurry was rinsed with warm tap water (110° F.) until all the cleaning slurry was removed. Following this, the upper glass surface was rinsed with demineralized water having a pH of approximately 6.5 and a numerical hardness rating of less than 5 parts per million and the additional characteristics described above by spraying the demineralized water onto the upper surface of the glass. During this demineralized water rinse, the glass was traveling on rollers which conveyed the glass at a speed of 10 feet per minute. Approximately 0.3 to 0.4 gallon of demineralized water was applied per minute to the top surface of the glass articles to be filmed as they proceeded under the overhead demineralized water applying sprayheads.

Then the top surface of the glass articles (i.e., the surface to be filmed) was air dried by blowing compressed air thereon. Meanwhile, the bottom surface of the glass was dried by contact with blotter rolls periodically spaced on the conveyor roll system. Then these demineralized, rinsed glass articles were conveyed at the same rate of speed into a heating furnace. The entrance of the heating furnace was maintained at room temperature, whereas the temperature of the exit end of the heating furnace was maintained between 1100 and 1200° F. The dwell time in the heating furnace was approximately 4 minutes for each glass sheet. This was sufficient time to raise the temperature of the glass sheet from ambient room temperature to a temperature of approximately 1150° F. at the exit end of the heating furnace.

The tin and cobalt containing solutions were sprayed onto the top surface of the glass sheets from Binks No. 18 spray guns having a fluid orifice diameter of 0.016 inch for the tin-containing solution and 0.033 inch orifice diameter for the cobalt-containing solution and equipped with "Teflon" packing and piston gaskets. The first spray gun, dispersing the tin-containing solution, was located at a distance of 8½ inches from the outermost end of the heating furnace. The second and third guns dispense the cobalt-containing solution onto the glass sheet having been previously coated with a tin compound dispensed from the first spray gun. These three spray guns were arranged in tandem with the spray opening of each gun located approximately 9 inches above the upper glass surface to be coated. The spray head of the second spray gun was located approximately 10 inches from that of the first spray gun. The third spray gun, also dispensing the cobalt coating solution, was located approximately 9 inches from the second spray gun.

The organic tin solution dispensed from the first spray gun contained 100 grams of dibutyl tin oxide, 40 grams of ammonium acetate, 86.4 grams of a 10 percent by weight HF solution in 3A alcohol (5 gallons of methanol alcohol mixed with 100 gallons of 95 percent pure ethanol alcohol), 226 cubic centimeters of n-propyl alcohol and sufficient HCl to yield approximately 0.5 percent by weight based on the weight of the tin in the solution. This tin solution was dispensed onto the heated glass surface from the spray gun using an air pressure of 45 pounds per square inch gauge.

The cobalt acetylacetone coating solution contained in both the second and third spray guns consisted of 3.56 percent by weight cobalt acetylacetonate, 3.56 percent by weight iron acetylacetonate, 5.47 percent by weight chromium acetylacetonate, 67.1 percent by weight benzene, and 20.31 percent by weight methanol with the latter two materials serving as solvents. This cobalt-containing coating solution was prepared by first mixing the benzene and methanol solvents and then secondly dissolving the cobalt, iron and chromium acetylacetonates therein. The air pressure and fluid orifice diameter of the spray guns dispensing the cobalt-containing coating solution were the same as those set forth above in conjunction with the tin coating solution. Both the second and third spray guns dispensed the same cobalt-containing solution.

The glass sheet was conveyed at a linear rate of speed of approximately 10 feet per minute past the three spray guns arranged in the manner indicated above. After the deposition of the last coating, the thus coated glass sheets, which were at a temperature of approximately 900° to 1100° F., were allowed to cool gradually to ambient room temperature.

The thus coated glass sheets possessed an average luminous transmittance of 45 percent, an average total solar energy reflectance of 32 percent, and had a light blue color on the coated side due to the cobalt oxide in the metal oxide overcoating. The articles produced in this example have utility as monolithic radiant solar energy reflecting transparent viewing enclosures. Uncoated glass sheets of identical composition possess a luminous transmittance of 90 percent and an average total solar energy reflectance of 8 percent.

The thickness of the tin oxide layer was about 0.025 micron and the thickness of the cobalt oxide-iron oxide-chromium oxide layer was about .047 microns.

Example II.—Glass composition

| Component | Percent by weight |
|---|---|
| $SiO_2$ | 71.6 |
| $Na_2O$ | 13.1 |
| CaO | 11.7 |
| MgO | 2.5 |
| $Na_2SO_4$ | 0.7 |
| NaCl | 0.1 |
| $Fe_2O_3$ | 0.1 |
| $Al_2O_3$ | 0.2 |

Glass plates 12 inches by 12 inches by ¼ inch of the calculated composition listed above were cleaned with pumice, rinsed with warm tap water and spray rinsed with demineralized water as in Example I.

These plates were then heated gradually from room temperature to a temperature of approximately 1200° F. in a glass heating furnace while supported on rollers as in Example I.

These glass plates were then coated with the dibutyl tin oxide-containing organic tin coating solution of Example I with the tin coating solution spray orifice located in the same manner specified in Example I with respect to the upper surface of the glass plate to be filmed.

The cobalt oxide coating was applied by the second and third spray guns arranged as in Example I. However, instead of using the cobalt acetylacetonate-containing coating solution as in Example I, a benezene solution of cobalt acetylacetonate, alone, was dispensed from the second and third spray guns. This solution was prepared by dissolving sufficient cobalt acetylacetonate in benzene to yield a 12 percent by weight cobalt acetylacetonate-benzene solution. The overcoat metal oxide in this example consisted wholly of cobalt oxide. The transparent tin oxide undercoat-cobalt oxide overcoated glass plates demonstrate excellent properties as monolithic solar radiant energy reflecting transparent viewing enclosures. After coating, these plates possessed an average luminous transmittance of 47 percent and an average total solar energy reflectance of 32 percent. The thickness of the thin tin oxide coating ranges from 0.023 to 0.042 micron and the thickness of the overcoated transparent cobalt oxide coating ranges from 0.027 to 0.047 micron. Uncoated glass plates of identical compositions possess an average luminous transmittance of 89 percent and an average total solar energy reflectance of 8 percent.

Example III.—Glass composition

| Component | Calculated percent by weight |
|---|---|
| $SiO_2$ | 68.9 |
| $Na_2O$ | 16.1 |
| CaO | 7.7 |
| MgO | 2.7 |
| $Na_2SO_4$ | 0.6 |
| NaCl | 0.2 |
| $Fe_2O_3$ | 0.1 |
| $Al_2O_3$ | 3.0 |
| $K_2O$ | 0.5 |
| $As_2O_5$ | 0.1 |
| BaO | 0.05 |
| NiO | 0.025 |
| CoO | 0.0039 |

Light gray tinted glass plates of the above listed calculated composition in a thickness of 3/16 inch were pumice cleaned, rinsed in warm tap water, and then spray rinsed with demineralized water as in Example I. Then the thus rinsed plates were heated as in Example I but to a glass surface temperature of approximately 1150° F.

The thus heated glass plates were then coated first with the dibutyl tin oxide-containing organic tin coating solution as in Example I and thereafter with a cobalt acetylacetonate solution containing 18.5 percent by weight cobalt acetylacetonate, 62.7 percent by weight benzene and 18.8 percent by weight methanol. The positional arrangement of the three spray guns was essentially the same as in Example I, the sole exception being that the second cobalt spray gun (the one furtherest from the exit end of the furnace) was spaced 10 inches from the first cobalt coating solution spray gun. All three spray guns were mounted to have their spray orifices positioned approximately 9 inches from the upper surface of the glass plates to be filmed. The thickness of the undercoat tin oxide film and the thickness of the overcoated cobalt oxide film was approximately the same as that listed in Example II. prior to receiving the transparent tin oxide and transparent cobalt oxide coatings, the light gray colored transparent glass plates of the composition listed above had a luminous transmittance of 63 percent and an average total solar energy reflectance of 7 percent. After receiving the tin oxide and cobalt oxide coatings, these glass plates had an average luminous transmittance of 29 percent and an average total solar energy reflectance of 32 percent.

Example IV.—Glass composition

| Component | Calculated percent by weight |
|---|---|
| $SiO_2$ | 71.2 |
| $Na_2O$ | 13.7 |
| CaO | 11.8 |
| MgO | 2.3 |
| $SO_3$ | 0.4 |
| $Al_2O_3$ | 0.2 |
| $Fe_2O_3$ | 0.4 |
| CoO | 0.008 |
| NiO | 0.0009 |
| Se | 0.005 |

Neutral gray glass sheets of the heat absorbing glass composition listed above in a thickness of ¼ inch were pumice cleaned, rinsed with warm tap water and then rinsed with demineralized water in accordance with Example I. These neutral gray colored sheets prior to coating possess a luminous transmittance of between 35 and 45 percent and a total solar energy reflectance of 6 percent.

Then the thus cleaned and rinsed glass sheets, 12 inches by 12 inches by ¼ inch, were gradually heated in a heating furnace to a temperature of approximately 1125° F. over a heating period of approximately 3½ minutes.

Then the hot glass sheets were coated with an organic tin coating solution which was in all respects the same as that employed in Example I except that instead of employing dibutyl tin oxide as the organic tin compound, dibutyl tin di-acetate diluted to 50 percent concentration with n-propyl alcohol was used in the same weight amount as was dibutyl tin oxide of Example I. Immediately following the deposition of the tin oxide film, the hot glass sheets were coated with a cobalt acetylacetonate-containing organic solution having 12 percent by weight cobalt acetylacetonate, 12 percent by weight iron acetylacetonate, 58.3 percent by weight benzene and 17.7 percent by weight methanol.

The spacing arrangement of the first spray gun (organic tin coating solution) and the second and third spray guns (cobalt acetylacetonate-iron acetylacetonate coating solutions) was the same as noted above in Example III. Identical cobalt and iron acetylacetonate solutions were dispensed from the second and third spray guns.

Following formation of the cobalt oxide-iron oxide overcoat film, the thus coated glass sheets were gradually cooled as in Example I. After coating the sheets possessed an average luminous transmission of 21 percent and an average total solar reflectance of 30 percent. These monolithic sheets possess utility as transparent solar reflecting viewing closures.

Example V.—Glass composition

| Component | Percent by weight |
|---|---|
| $SiO_2$ | 71.3 |
| $Na_2O$ | 13.3 |
| CaO | 11.7 |
| MgO | 2.5 |
| $Na_2SO_4$ | 0.7 |
| $Fe_2O_3$ | 0.4 |
| CoO | 0.0038 |
| Se | 0.008 |

Twelve (12) inch by 12 inch by ¼ inch plates of the calculated glass composition given were cleaned and given a precoating demineralized water rinse in accordance with Example I above. Then the cleaned plates were heated in a heating furnace to a temperature of approximately 1100° F. prior to contact of the heated glass surfaces with the 50 percent diluted dibutyl tin di-acetate coating solution of Example IV. The spacing arrangement of the organic tin and cobalt acetylacetonate-containing solution spray guns was the same as set forth above in Example IV. Both the second and third spray guns dispensed a cobalt acetylacetonate-iron acetylacetonate-chromium acetylacetonate coating solution containing 7.22 percent of the cobalt acetylacetonate, 7.22 percent of the iron acetylacetonate, 10.72 percent of the chromium acetylacetonate, 56.14 percent benzene and 18.70 percent methanol, all percents being by weight. The thickness of the transparent tin oxide coating was approximately .025 micron and the thickness of the cobalt oxide-iron oxide-chromium oxide overcoating was approximately .047 micron.

The thus coated plates possess an average luminous transmittance of 27 percent and an average total solar energy transmittance of 31 percent as compared to the uncoated plates of identical glass composition which have a luminous transmittance of 50 percent and a total solar energy transmittance of 47 percent. These articles are useful as monolithic solar shielding transparent viewing closures.

Example VI.—Glass composition

| Component | Percent by weight |
|---|---|
| $SiO_2$ | 68.8 |
| $Na_2O$ | 15.3 |
| CaO | 7.0 |
| MgO | 2.7 |
| $Na_2SO_4$ | 0.5 |
| $Fe_2O_3$ | 0.9 |
| CoO | 0.0035 |
| NiO | 0.024 |
| $As_2O_5$ | 0.1 |
| $Al_2O_3$ | 3.3 |
| BaO | 0.6 |
| $K_2O$ | 1.1 |

Twelve (12) inch by 12 inch by ¼ inch plates of the heat absorbing glass composition given above were pumice cleaned, rinsed in warm tap water and thereafter rinsed in de-ionized water as in Example I.

The thus cleaned plates were then heated in a heating furnace to a glass surface filming temperature of approximately 1275° F. Then the thus heated plates were sprayed with an organic tin compound-containing coating solution the same as given above in Example IV except that in place of the 50 percent diluted dibutyl tin di-acetate, an equal weight mixture of stannous 2-ethyl hexanoate, stannous n-octoate and stannous isooctoate was employed in its place. The weight concentration of these three stannous octoate salts was the same as the dibutyl tin-di-2-ethyl hexanoate in Example IV.

Immediately after formation of the thin transparent tin oxide coating, the hot glass was sprayed with a suspension of cobalt acetylacetonate, 3.56 weight percent, iron acetylacetonate, 3.56 weight percent, and nickel acetylacetonate, 3.42 weight percent with the remaining 89.46 weight percent being 17.89 methanol and 71.57 toluene. Only 3.4 percent of the nickel acetylacetonate is soluble in this solvent; the balance remains in suspension. The spacing arrangement employed for the three spray guns was the same as set forth above in conjunction with Example I with the first spray gun dispensing the tin oxide-forming organic tin coating solution and the second and third gun dispensing the cobalt acetylacetonate containing coating suspension.

The thus coated plates were allowed to cool gradually to ambient room temperatures. The thickness of the transparent tin oxide coating was approximately 0.023 to 0.042 micron and the thickness of the cobalt oxide-iron oxide-nickel oxide overcoating was approximately 0.027 to 0.047 micron. The articles produced in this example can be employed as monolithic solar energy transmission reducing transparent viewing closures.

Example VII.—Glass composition

| Component | Calculated percent by weight |
|---|---|
| $Fe_2O_3$ | 0.51 |
| $SiO_2$ | 71.25 |
| CaO | 11.71 |
| $Al_2O_3$ | 0.15 |
| MgO | 2.41 |
| $Na_2SO_4$ | 0.60 |
| $Na_2O+K_2O$ | 13.37 |

Tinted glass plates of the above calculated composition and a thickness of ¼ inch were pumice cleaned, rinsed in warm tap water, and then spray rinsed with diminerialized water as in Example I. Then the cleaned and rinsed glass sheets were gradually heated in a heating furnace to a temperature of approximately 1080° to 1100° F.

The thus heated glass plates were then coated, first with the dibutyl tin oxide-containing organic tin coating solution, as in Example I, and thereafter with a cobalt acetylacetonate solution containing 11.8 percent by weight cobalt acetylacetonate, 11.8 percent by weight iron acetylacetonate, 1.37 percent by weight chromium acetylacetonate, 17.43 percent by weight methanol and 57.6 percent by weight benzene.

Following formation of the cobalt oxide-iron oxide-chrominum oxide overcoat film, the thus coated glass sheets were gradually cooled, as in Example I. These monolithic sheets possess utility as transparent solar reflecting viewing closures.

Example VIII

Tinted glass plates of the identical glass composition and thickness as in Example VII were pumice cleaned, rinsed in warm tap water, and then spray rinsed with demineralized water, as in Example I. Then the thus rinsed plates were heated as in Example I, but to a glass surface temperature of approximately 1080° to 1100° F.

The thus heated glass plates were then coated, first with the dibutyl tin oxide-containing organic tin coating solution, as in Example I, and thereafter with a cobalt acetylacetonate solution containing 17.6 percent by weight cobalt acetylacetonate, 6.08 percent by weight iron acetylacetonate, 1.37 percent by weight chromium acetylacetonate, 17.4 percent by weight methanol and 57.55 percent by weight benzene.

Following formation of the cobalt oxide-iron oxide-chromium oxide overcoat film, the thus coated glass sheets were gradually cooled, as in Example I. After coating, the sheets possessed an average luminous transmission of 27 percent and an average total solar reflectance of 34 percent. These monolithic sheets possess utility as transparent solar reflecting viewing closures.

Example IX

The monolithic tin oxide-cobalt oxide-containing overcoated metal oxide transparent articles of Examples I to VIII were subjected to outdoor exposure tests in substantially different geographic locations for periods up to and in excess of 12 months with no indication of film failure or loss of solar energy reflectance.

Example X

The monolithic coated tin oxide-cobalt oxide coated glass articles of Examples I to VIII, inclusive, were subjected to salt spray testing in accordance with Federal Test Method Standard No. 151, formerly Federal Specification QQ–M–151a which consisted of placing the coated articles into a moisture humidity control cabinet and varying the humidity over given time periods while periodically spraying the filmed glass surfaces with an aqueous solution of sodium chloride having a 5 percent by weight sodium chloride content. The temperature in the control cabinet is maintained at 95° F. plus 2° F. or minus 3° F. Comparable test samples were prepared as in Examples I to VIII respectively, but omitting the tin oxide undercoat.

After more than 3000 hours of testing, none of the samples having the tin oxide undercoat and the cobalt oxide-containing overcoat failed the salt spray durability test, but all of the cobalt oxide coated glass articles having no tin oxide undercoat failed within 48 hours of testing.

Example XI

The transparent coated glass articles of Examples I to VIII, inclusive, were subjected to an adhesion test which consisted of placing scotch tape on the cooled cobalt oxide-containing overcoat film and then rapidly tearing the free end (not contacting the film surface) of the scotch tape in an attempt to remove a portion of the metal oxide overcoat film. The adhesion of the cobalt oxide-containing overcoat films was excellent, and no film removal was visible from this test.

Example XII

The tin oxide-cobalt oxide coated glass articles of Examples I to VIII respectively, were laminated according to conventional procedures using polyvinyl butyral interlayer material and then placing the metal oxide film surfaces in contact with the polyvinyl butyral so that the metal oxide film surfaces were located interiorly in the laminate. The laminated articles were of a sandwich type or safety glass structure and can be used as laminated solar radiant energy shielding, transparent viewing closures for automobiles, airplanes and other vehicles.

Example XIII

The transparent coated tin oxide-cobalt oxide overcoated glass articles of Examples I to VIII, respectively, were formed into insulating glass units having a hermetically sealed air space therebetween. These insulating glass units were formed in accordance with U.S. Patent 2,830,810 and had a metal channel throughout their outer edge periphery. These insulating units were prepared with both metal oxide filmed surfaces located interiorly (on the air space side) of the insulating unit.

These multiple glazed, transparent coated glass insulating units can be employed as transparent solar radiant energy shielding viewing closures to serve all the purposes presently served by uncoated insulating glass units with the added advantage of reducing solar energy transmittance therethrough.

While the above examples show the practice of the present invention of soda-lime-silica glass base compositions, it should be realized that the benefits obtainable in accordance with this invention can be secured on any transparent glass, regardless of its specific composition. Hence, this invention is broadly applicable to all types of transparent glass compositions, whether colored or clear, and whether heat absorbing or non-heat absorbing. For example, this invention can be employed to form transparent viewing closures having greatly improved solar radiant energy shielding properties when applied to alkali-alumina-silica glass compositions, such as those containing lithia as an alkali component, alkali-zirconia-silica glasses and alkali-alumina-zirconia-silica glasses.

The present invention is especially well suited as a treatment for soda-lime-silica-containing glass base compositions. Representative soda-lime-silica glass base compositions usually contain 65 to 75 percent by weight $SiO_2$, 10 to 18 percent by weight $Na_2O$, 5 to 15 percent by weight CaO, 0 to 5 percent by weight MgO, 0 to 1.0 percent by weight $Na_2SO_4$, 0 to 5 percent by weight aluminum oxide ($Al_2O_3$), 0 to 2 percent by weight $K_2O$, 0 to 1 percent by weight iron oxide ($Fe_2O_3$) and 0 to 0.5 percent by weight of NaCl, $As_2O_5$, BaO and Ni, CoO and Se.

The articles produced in accordance with this invention can be used as heat shielding windows, insulation units, laminates, backlights, sidelights and windshields, heat retaining transparent oven doors, architectural spandrels, sunglasses, and in general, transparent viewing enclosures for rooms and compartments of buildings, homes and vehicles.

While the present invention has been described in great detail in the foregoing examples, it is not intended that the above examples are necessarily limited by the specific filming temperatures, cobalt oxide-forming coating solutions, organic tin compounds and coating solvents, and other non-essential procedural features described above.

We claim:

1. A method of preparing glass products of reduced radiant solar energy transmittance which comprises heating the glass to a temperature of at least 400° F. but below the glass softening temperature, forming a transparent tin oxide coating on said heated glass, and contacting the tin oxide surface of said heated tin oxide coated glass with a solution of cobalt acetylacetonate to form a transparent cobalt oxide coating thereon.

2. A method according to claim 1 wherein said glass is a soda-lime-silica glass.

3. A method according to claim 1 wherein said glass is heated to a temperature ranging from about 1000 to 1300° F.

4. A method according to claim 1 wherein said glass base is cleaned and rinsed with demineralized water prior to heating to receive the tin oxide coating.

5. A method of preparing transparent glass products of reduced radiant solar energy transmittance which comprises heating a transparent soda-lime-silica glass to a temperature of at least 400° F. but below the glass softening temperature, contacting said heated glass with an organo tin compound to form a transparent tin oxide coating thereon, and contacting said tin oxide surface of said heated tin oxide coated glass with a solution of cobalt acetylacetonate to form a transparent cobalt oxide coating thereon.

6. A method according to claim 5 wherein said organo tin compound is dibutyl tin oxide.

7. A method of preparing glass products of reduced radiant energy transmittance which comprises heating glass to a temperature of at least 400° F. but below the glass softening temperature, contacting the heated glass with an organo tin compound to deposit a transparent in oxide coating on said heated glass, and contacting a tin oxide surface of said heated tin oxide coated glass with an organo metallic coating composition solution containing at least 25 percent by weight of the organic metallic compounds present cobalt acetylacetonate to form a transparent cobalt oxide coating thereon.

8. A method according to claim 7 wherein said organo metallic cobalt acetylacetonate containing coating composition additionally contains iron acetylacetonate thereby resulting in the formation of a cobalt oxide-containing iron oxide-containing metal oxide coating.

9. A method according to claim 7 wherein said organo metallic coating composition additionally contains the acetylacetonates of iron and chromium thereby resulting in the formation of a cobalt oxide-iron oxide-chromium oxide coating.

10. A method according to claim 9 wherein said glass is a soda-lime-silica glass.

References Cited

UNITED STATES PATENTS

| | | | |
|---|---|---|---|
| 2,839,424 | 6/1958 | Labino | 117—54 |
| 2,567,331 | 9/1951 | Gaiser et al. | 117—54 |
| 3,202,054 | 8/1965 | Mochel | 88—106 |
| 2,383,470 | 8/1945 | Morgan | 117—54 X |
| 2,882,377 | 4/1959 | Rinehart | 117—229 X |
| 2,915,730 | 12/1959 | Davis | 117—229 X |
| 2,949,387 | 8/1960 | Colbert et al. | 117—211 |
| 3,078,693 | 2/1963 | Lytle | 117—124 |
| 3,087,831 | 4/1963 | Browne | 117—35 |
| 3,185,586 | 5/1965 | Saunders et al. | 117—124 X |

ALFRED L. LEAVITT, *Primary Examiner.*

W. L. SOFFIAN, *Assistant Examiner.*